United States Patent [19]

Hoeller et al.

[11] 3,999,385
[45] Dec. 28, 1976

[54] HYDRODYNAMIC CONTROL COUPLING

[75] Inventors: Heinz Hoeller; Klaus Nolz; Thomas Roegner, all of Crailsheim, Germany

[73] Assignee: Voith Turbo KG, Crailsheim, Germany

[22] Filed: Jan. 5, 1976

[21] Appl. No.: 646,581

[30] Foreign Application Priority Data

Jan. 17, 1975  Germany .................... 2501708

[52] U.S. Cl. ................................ 60/330; 60/337; 60/347; 60/364
[51] Int. Cl.² .................................... F16D 33/00
[58] Field of Search .......... 60/329, 330, 337, 347, 60/364

[56] References Cited
UNITED STATES PATENTS 2,634,583  4/1953  Shurts ........................ 60/364 X

*Primary Examiner*—Edgar W. Geoghegan
*Attorney, Agent, or Firm*—Edwin E. Greigg

[57] ABSTRACT

A hydrodynamic coupling for driving pumps, fans, and the like at variable shaft speeds includes coaxial primary and secondary impellers. The space defined within these impellers contains variable quantities of working fluid for transmitting the shaft torque from one impeller to the other. One of the impellers is equipped with a co-rotating casing, which encloses the other impeller and may serve to force working fluid into the working chamber. The fluid exits from the working chamber through an aperture in the higher-lying impeller and returns to a storage chamber from which a conduit transports it to the casing. A control valve in the conduit permits external flow control.

6 Claims, 4 Drawing Figures

HYDRODYNAMIC CONTROL COUPLING

BACKGROUND OF THE INVENTION

The invention relates to a hydrodynamic control coupling of the type whose axis of rotation is normally vertical and which includes a primary vane wheel or impeller and a secondary impeller which, together, form a toroidal working chamber. The coupling further includes a shell-like enclosure which rotates together with one of the impellers while enclosing the other. The coupling is further provided with a drainage means through which the working fluid may pass from the working chamber within the impellers to a locally fixed storage container and the system further includes a supply conduit which leads from the storage container via a control valve into a region lying immediately below the lower impeller. A known coupling of this type of construction (illustrated in the hand book: "VOITH Hydrodynamische Getriebe, Kupplungen und Bremsen", published by Otto Krauskopf Verlag, Mainz, Germany, 1970, page 256. Also illustrated in VOITH Company publication G 596, illustration 5) discloses a low lying storage container for the working fluid. The drainage means for the working fluid from the working volume into the storage container is located beneath the working chamber and is embodied as a fixedly attached scoop tube. The supply conduit, which serves to take working fluid back into the working chamber, includes a pump driven by the shaft of the primary impeller and a pressure line through which the fluid medium is passed through a control valve into the working chamber. The degree of filling within the working chamber, and hence the r.p.m. of the secondary impeller, can be adjusted by adjusting the control valve. The control valve may be adjusted by a regulating mechanism in dependence on any suitable parameter, for example a temperature (if the coupling drives a fan) or of a pressure (if the coupling is driving a pump).

OBJECT AND SUMMARY OF THE INVENTION

It is a principal object of the invention to provide a hydrodynamic control coupling which is constructed more simply than the known coupling but which may be used, as before, as the final control element in a control loop. This principal object is attained by the invention by providing that the drainage mechanism for taking fluid out of the working chamber includes at least a drainage aperture disposed in the top region of the rotating members of the coupling, and further by providing that the storage container has an annular configuration and encloses the impellers along their circumference and that the storage container is so located that it is able to contain the working fluid which extrudes from the drainage apertures and is so located vertically that the level of the fluid within the storage container is always higher than the terminus of the fluid conduit leading from the storage container back into the working chamber.

The invention is based on the recognition that the passage of fluid from the working chamber into the storage container and back into the working chamber, which is necessary for adjusting the degree of filling of the working chamber and also for cooling the working medium, can be greatly simplified over known structures especially in a coupling with a vertical axis of rotation. This simplification is obtained by the following means: Firstly, the storage container and the drainage opening from the working chamber are so located that, while the coupling is rotating, either when filled or only partially filled, the working medium extrudes in a free jet from the working chamber into the storage container which surrounds the impellers in annular fashion. There may be one or more such drainage apertures. An individual drainage opening may be disposed radially with respect to the rotational axis of the coupling, but preferably they will proceed in a direction obliquely upward so that the storage container can be raised to the approximate height of the working chamber. This is important also because the level of the fluid within the working chamber is to be kept as high as possible even though the fluid enters in a free jet so that the working fluid can flow through the control valve into the region just below the impeller entirely under the influence of the difference in height. From the lower-lying region, the working fluid can enter the working chamber without further intervention, i.e., merely through a suitable opening.

However, it will often be more suitable to provide a structural member attached to the primary impeller which further propels the working fluid into the working chamber. This structural element can be embodied in many different ways. A pump is not required because the working fluid must be transported across only a very small difference in height, of at most a few centimeters. Therefore, a suitably shaped member which rotates together with the primary impeller, for example a ram plate, is sufficient. Normally the impellers are surrounded by a casing which rotates with one of the impellers and which encloses the other and this casing may be used as the fluid conveyor if it rotates with the primary impeller and if the primary impeller is located above while the casing is located below the secondary impeller. In that case, the fluid conduit leading from the storage container through the control valve may terminate directly in the casing which, due to its rotation, transports the working fluid into the working chamber through the gap formed between the casing and the secondary impeller. This embodiment has been shown to be particularly effective in experimentation.

If however the primary impeller is located below the secondary impeller, then it is most suitable to provide a ram plate or other centrifugal impeller at the underside of the primary impeller and extending radially therefrom within the working chamber. In that case, the working fluid would pass into the working chamber through bores. However, it is also possible to embody the coupling in such a manner that the working fluid is supplied to a casing which rotates with the secondary impeller. In that case, the working fluid must be transported into the working chamber through the underside of the primary impeller and for this purpose the primary impeller and the casing are made to form a relatively narrow gap. If the under-side of the primary impeller is equipped with vanes, the fluid transport is enhanced.

All of the embodiments of the coupling described above are very simply constructed and represent a very sturdy type of construction for a final control coupling inasmuch as they require neither a supply pump nor a scoop tube for maintaining the fluid circulation which is needed for operation. The degree of filling of the working chamber may be adjusted by adjusting the control valve in the fluid conduit just as in known couplings. Due to the particular construction of the invention, the dimensions of the housing which surround the coupling and the storage container may be kept very small, especially in the vertical direction.

The control coupling according to the present invention can be embodied for power flow in both directions, either from top to bottom or from bottom to top. Furthermore, in principle, either direction of power flow can be used with the primary impeller above or below (and the secondary impeller respectively below and above). Under certain circumstances, the casing described above as rotating with one of the two impellers can also be coupled with the drive shaft. For example, if the power flow is from the bottom up, the upper impeller would be the primary impeller and the lower impeller would be the secondary impeller. It is necessary only to avoid embodiments which would require leading one of the fluid conduits through one of the shafts because this entails expensive seals.

In yet another embodiment of the invention to be described in detail below, there is provided an additional secondary container radially within the primary storage container but below the impellers. This auxiliary container serves, in the first place, for containing leaking fluid. The re-supply of the leakage fluid from this auxiliary container into the main storage container can also take place in simple manner with the aid of some structural member which rotates with one of the impellers. Preferably, this will be the casing rotating with the primary impeller or the under-side thereof. In principle, however, other structural members could be used, for example those rotating with the secondary impeller, provided that it is permissible to return the leakage fluid only beginning with some particular rotational speed of the secondary impeller.

Whenever the coupling is stopped, a portion of the working fluid will flow from the working chamber into the region lying directly below the impellers except for the fluid which remains in the lower impeller. If a casing connected with one of the impellers is located beneath the impellers, then this portion of the working fluid would be caught in the casing and could be re-supplied to the working chamber whenever the coupling is restarted. In practice, however, the containment volume of this casing would not suffice to hold that great a portion of the working fluid. For this reason, the fluid will flow over into the above-mentioned auxiliary container but will be returned into the storage container in the same manner as the leakage fluid whenever the coupling is restarted.

The hydrodynamic control coupling according to this invention is particularly suitable for driving a centrifugal pump of relatively low input power, for example up to approximately 10 kilowatts.

Such pumps are used for pressure augmentation, for example in water supply systems. In such systems, the main requirement is constant output pressure while the input pressure and the flow rate are often subject to great fluctuations. The prime mover preferably is an electric short circuit motor (squirrel cage rotor). The pressure regulation is performed with the aid of a per se known control loop and includes the hydrodynamic control coupling according to the present invention as a final control member. The control loop so adjusts the control valve that the resulting change of the secondary r.p.m. (equal to the r.p.m. of the centrifugal pump) conforms the output pressure to the intended nominal value. In such centrifugal pump drives, the vertical pump shaft is preferably disposed below the drive means (and the suction tube of the pump points downwardly). The coupling and the electric motor are then mounted on top of the pump. This results in a space-saving pumping system. However, the decisive advantage is to be found in the simplicity of the above-described pressure control. Until the present time, such pumping installations had to be equipped either with electric motors of switchable polarity or with motors with electric r.p.m. control. The general use of the then known hydrodynamic control couplings for this control purpose has always been impeded by the previously very high cost of construction. It is only by the present invention that a hydrodynamic control coupling of extraordinary simplicity was provided, especially for driving machinery of relatively low power. Such machinery includes fans and other rotating devices with changing r.p.m., in addition to the above-mentioned centrifugal pumps.

Other objects and advantages of the present invention will be more readily apparent from a further consideration of the following detailed specification and the drawings illustrating preferred embodiments of the invention.

DESCRIPTION OF THE PREFERRED EMBODIMENTS

Figure 1:
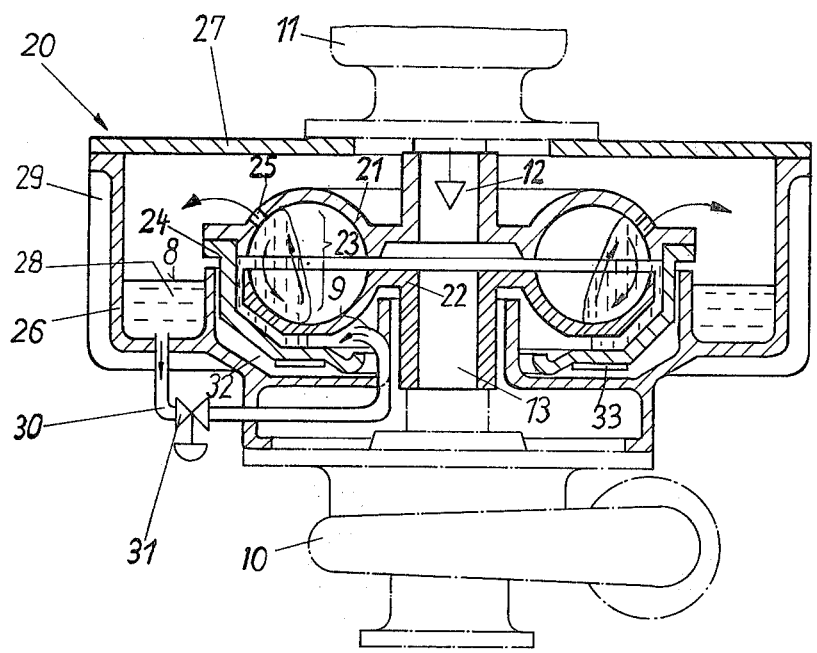
FIG. 1 is a sectional view of a hydrodynamic control coupling according to the invention in which power flows from the top to the bottom.

Turning now to FIG. 1, there is shown a centrifugal pumping system in which the pump 10 and its drive motor 11 are shown in dotted lines inasmuch as they do not constitute a part of the invention per se. Between these two elements, there is shown the hydrodynamic control coupling according to the invention and it carries the reference numeral 20. This control coupling 20 includes the following individual elements:

Element 21 — a primary (or pump) vaned wheel (impeller) attached for rotation together with the driving shaft 12 of the motor 11;

A secondary (or turbine) vaned wheel (impeller) 22, attached for rotation to the driving shaft 13 of the centrifugal pump 10;

A toroidal working chamber 23 formed by the impellers 21 and 22 and partially filled with working fluid;

A casing 24 affixed to the primary impeller 21 and enveloping the second impeller 22;

A discharge aperture 25 serving as the draining means of working fluid and disposed within the primary impeller 21;

A housing 26 including a cover 27 which contains the coupling and serves at the same time for supporting the motor 11 on the pump system 10;

An annular storage container 28 of U-shaped cross section formed by the housing and enveloping the impellers 21 and 22, for containing the working fluid which emerges from the discharge aperture 25; the level of fluid within the container 28 carries the reference numeral 8;

Cooling vanes 29 attached to, or part of, the storage container 28;

A fluid supply conduit 30 leading from the storage container 28 to the gap formed between the casing 24 and the secondary impeller 22; the terminus of the conduit 30 carries the reference numeral 9;

A control valve 31 located in the supply conduit 30 and adjusted by a control loop (not shown) which holds the output pressure of the pump 10 constant;

An auxiliary annular container 32 for receiving leaking fluid as well as a portion of the working fluid when the pump system is stopped;

Vanes or ribs 33 affixed to the lower side of the casing 24 which tend to favor the resupply of fluid from the container 32 into the storage container 28 (suitable ribs or vanes can be disposed on the top side of the casing 24).

The above listed elements cooperate in the manner previously described to transmit power from the motor 11 to the pump 10 with a variable speed ratio which is determined by the amount of working fluid which is set, in turn, by the control valve 31.

Figure 2:
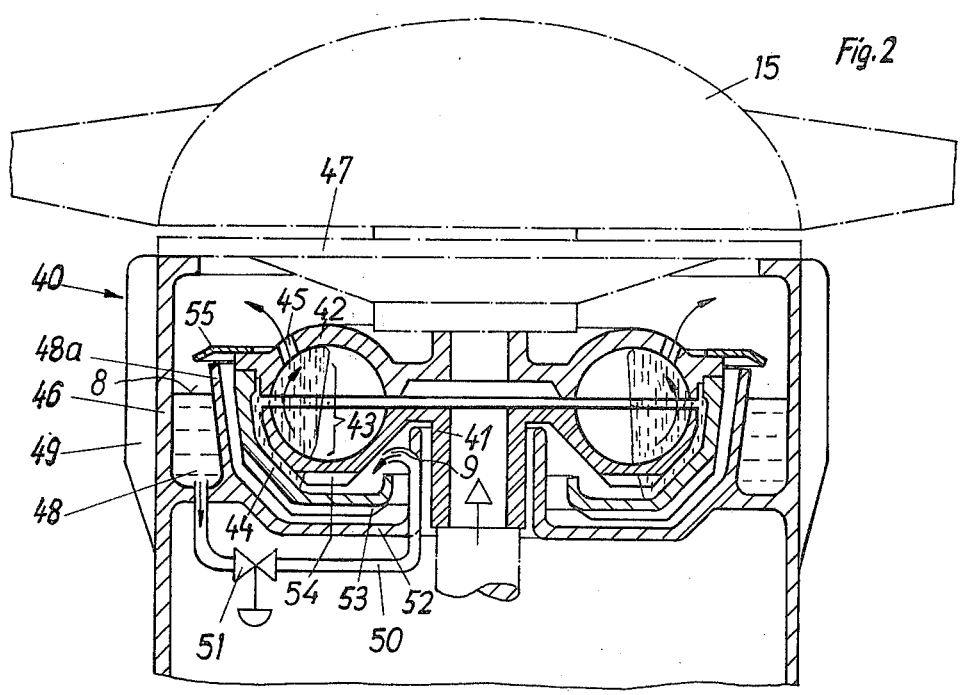
FIG. 2 is a sectional view of a similar coupling in which power flows upwardly.

In the secondary exemplary embodiment according to FIG. 2, a hydrodynamic control coupling 40 similar to that shown in FIG. 1 serves for driving a fan 15 which has a vertically standing axis of rotation and is located above the coupling. The drive means are not shown in this figure. The coupling according to the embodiment of FIG. 2 includes the following elements:

A primary vaned wheel (impeller) 41;

A secondary vaned wheel (impeller) 42;

A working chamber 43 formed between the impellers;

A casing 44 attached to the secondary impeller 42 and enveloping the primary impeller 41;

A discharge aperture 45 disposed within the secondary impeller 42;

A locally fixed housing 46 having cooling vanes 49;

A housing cover 47 as well as bearing shells for the containment of joint bearings for the secondary impeller and the fan wheel 15;

A storage container 48;

A supply conduit 50 including a control valve 51;

An auxiliary supply container 52;

Vanes 53 for increasing the pumping effect of the casing 44 in the gap formed between the casing 44 and the container 52;

Vanes 54 for increasing the pumping action of the primary impeller 41 in the gap formed between the primary impeller 41 and the casing 44; and A splash pan 55.

In addition to the opposite flow of power in this embodiment with respect to that in FIG. 1, there is the further difference that the interior wall 48a of the storage container 48 extends further upwardly than was the case in the first embodiment and permits an increase of the height difference between the level 8 of the fluid in the storage container 48 and the terminus 9 of the supply conduit 50 in the gap between the primary impeller 41 and the casing 44. This has a favorable effect on the control domain of the control valve 51.

Figure 3:
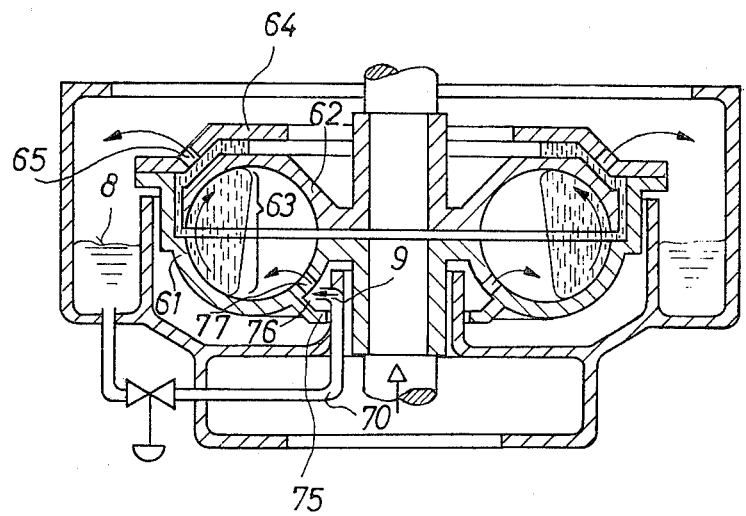
FIG. 3 is a view of a second embodiment of the coupling shown in FIG. 2.
Figure 4:
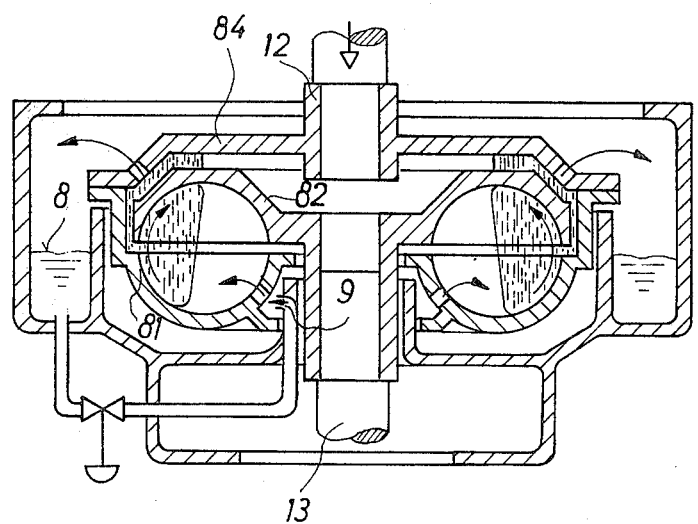
FIG. 4 is a second embodiment of the coupling shown in FIG. 1.

FIG. 3 depicts a third embodiment of the invention which differs from that shown in FIG. 4 substantially only in that the casing 64 is not connected to rotate with the upper secondary impeller 62 but rather with the lower primary impeller 61 while being disposed above the secondary impeller. For this reason the gap formed between the casing 64 and the secondary impeller 62 is not available for the supply of working fluid into the working chamber 63; however, the discharge opening 65 is now disposed within the casing 64. In order to permit supply of fluid, a flange 75 is formed at the lower side of the primary impeller 61 and this flange 75 acts as a ram plate and, together with the primary impeller, forms an annular volume 76. The supply conduit 70 terminates in the annular volume 76 from which bores 77 lead into the working chamber 63.

FIG. 4 depicts the same disposition of elements as is shown in FIG. 3. In this instance, the lower-lying primary impeller 81 is connected through the casing 84 with the top lying primary shaft 12 while the top-lying secondary impeller 82 is coupled directly to the lower-lying secondary shaft 13. In this manner, the flow of power is reversed with respect to that in FIG. 3.

While the storage containers 28 and 48 are preferably annular, it should be noted that the annular cross section (the profile) of the storage container need not be the same in all locations. Thus, for example, the exterior wall of the storage container which also forms the housing 26 or 46, as seen in the direction of the axis of rotation, may be circular, rectangular, or even completely irregular. Preferably, the interior wall, designated 48a in FIG. 2, would be circular and so located that it tightly envelops the impellers 21, 24; 41, 42; 61, 62; 81, 82 (while forming a very narrow gap). However, embodiments which differ from these descriptions are also conceivable. Thus, for example, a relatively wide space may be provided between the impellers and the interior wall 48a which would be covered by a co-rotating splash pan 55.

What is claimed is:

1. A hydrodynamic control coupling with a vertical axis of rotation, including a primary impeller wheel and a coaxial secondary impeller wheel, said impellers co-operating to define a substantially toroidal working chamber, a casing fixedly attached to one of said primary and secondary impellers so as to substantially envelop the other of said impellers, a storage container for working fluid, a supply conduit for carrying working fluid from said storage container to a terminus located in a region below the lower-lying one of said impellers, said supply conduit including a control valve, and drainage means for draining working fluid from said working chamber, the improvement comprising:
   a. said drainage means including at least an orifice in one of said impellers, said orifice causing communication between said working chamber and the space surrounding said impellers; and
   b. said storage container being an annular storage container so disposed as to substantially surround the radial extent of said impellers, for collecting working fluid emerging from said orifice, portions of said storage container lying vertically above the terminus of said supply conduit.

2. A coupling as defined in claim 1, including baffle means connected to said primary impeller, for urging working fluid to pass from said region below the lower-lying impeller into said working chamber.

3. A coupling as defined in claim 2, wherein said primary impeller lies vertically above said secondary impeller, said casing is attached to said primary impeller to co-rotate therewith and extends substantially below said secondary impeller, said terminus extends into said casing, and said casing is embodied to be said baffle means for urging working fluid to pass from said region below the lower-lying impeller to said working chamber.

4. A coupling as defined in claim 2, wherein said primary impeller lies vertically below said secondary impeller, and wherein said baffle means and said primary impeller define an annular space into which said terminus extends and which communicates with said working chamber.

5. A coupling as defined in claim 1, wherein said primary impeller lies vertically below said secondary impeller, said casing is attached to said secondary impeller and extends below said primary impeller and said terminus extends into said casing, and wherein said casing and said primary impeller define a narrow annular space through which working fluid passes into said working chamber.

6. A coupling as defined in claim 1, further comprising an auxiliary storage container located substantially below said impellers, for collecting working fluid from said coupling.

* * * * *